Aug. 13, 1946. H. A. KNOX 2,405,582
CLUTCH
Filed March 8, 1944 2 Sheets-Sheet 1

Inventor
Harry A. Knox

Aug. 13, 1946.    H. A. KNOX    2,405,582
CLUTCH
Filed March 8, 1944    2 Sheets-Sheet 2
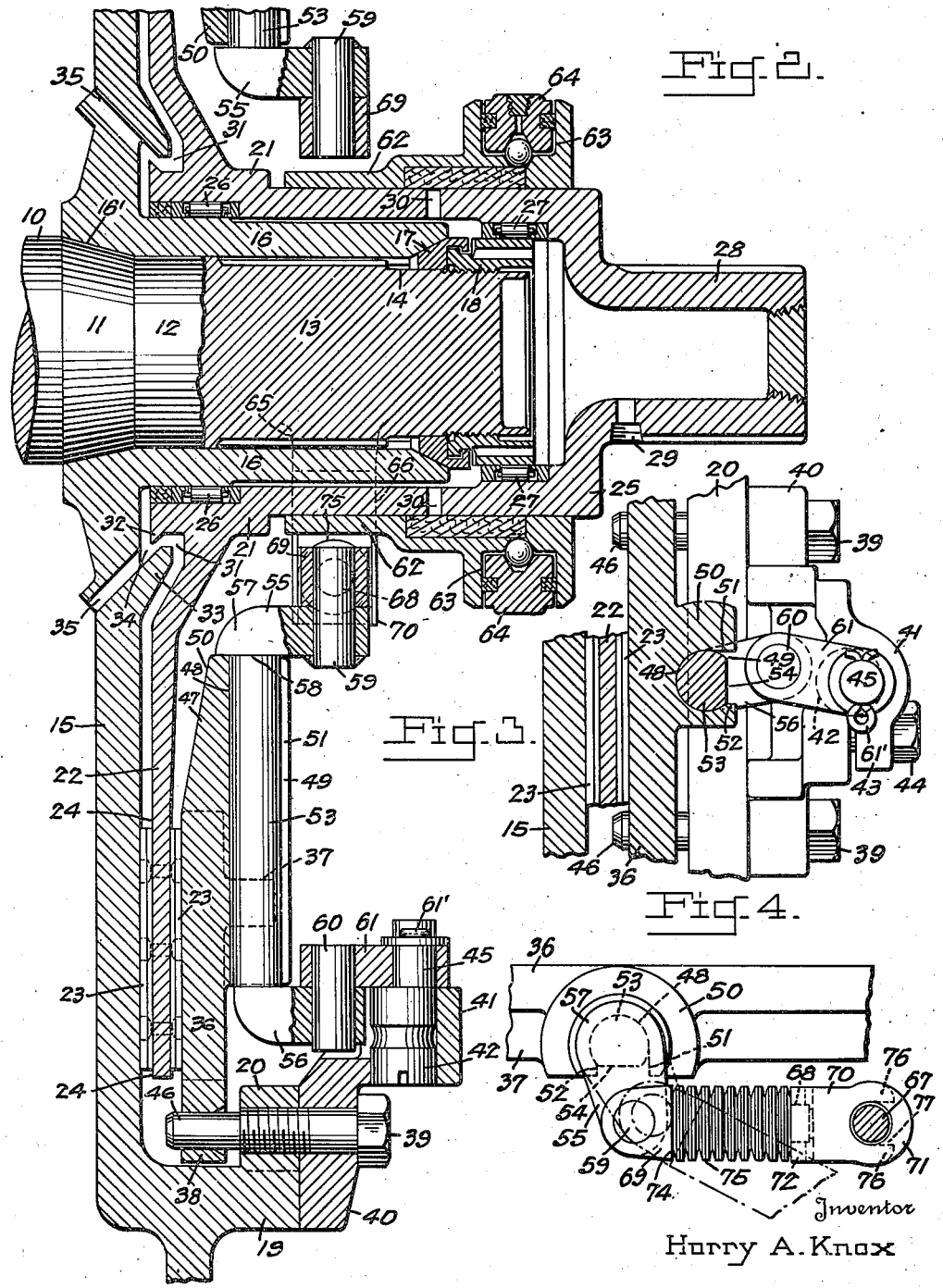
Inventor
Harry A. Knox Patented Aug. 13, 1946

2,405,582

UNITED STATES PATENT OFFICE 2,405,582

CLUTCH

Harry A. Knox, Washington, D. C.

Application March 8, 1944, Serial No. 525,511

17 Claims. (Cl. 192—68)

(Granted under the act of March 3, 1883, as amended April 30, 1928; 370 O. G. 757)

The invention described herein may be manufactured and used by or for the Government for governmental purposes without the payment to me of any royalty thereon.

The invention relates to power transmission clutches, and has for an object to effect improvement in a disc clutch operated through an axially slidable throwout member.

The invention aims specially to improve connections between a sliding sleeve and a presser plate on a rotative member whereby friction elements of respective rotating members may be clamped together to form the clutch connection.

A further important purpose is to offer an improved construction for operating the presser plate to attain high clutching efficiency within a moderate space.

It is a specially important object of the invention to present novel means for amplifying the force applied through a spring element while involving only a moderate extent of movement of the spring element.

It is well appreciated that one of the most important objects in clutches for power transmissions between internal combustion motors and final drive in motor vehicles is economy of space, especially longitudinally of the axis of rotation of the driving and driven members, or longitudinally of the axes of the gearing of speed-changing transmission; and ordinarily all of the axes indicated are laid in the same direction, making the reduction of space required for the clutch still more important.

In the production of military material there are several factors making this attainment paramount. First, all possible space is desired within the length of the vehicle for many auxiliaries, second, the running gear is in many cases short-coupled, and to this is often added a four-wheel drive making further requirement for such economy of space.

Recently the use of radial airplane-type motors, especially in tanks, has put a further premium on space, because of the size of these motors, and in tanks, the limitations imposed by the use of armor (making it necessary to encompass as small a space therewith as possible and yet protect the power plant, driver and large crew) and the multiplication of gun units radio equipment and other elements have put a barrier in the way of amplifying conventional clutch designs to carry the prodigious loads involved by the great mass of these vehicles and the greatly enlarged power output required to move them at the high speeds demanded in the current war. The enlargement of springs in usual locations to afford the necessary clutch pressure, and the multiplication of discs and clutch surfaces have reached boundaries of practicability, without a satisfactory solution of the problem. The use of more than one disc is objectionable because of the greater longitudinal space required and also the added machine operations, fitting and assembly operations, and added materials. Sliding and keying or splining of the multiple discs on both driving and driven members is a serious objection. The greater pressures required where a single disc is employed of moderate diameter has been an insurmountable difficulty, where the limitations of space, economy in material and reasonable ease of assembly are satisfied; and it is one of the most important motives in this invention to enable the production of a single disc clutch and an amply adequate pressure applying means to clamp the disc to relatively rotating parts so as to transmit the high torque involved in tank power plants, and at the same time gain marked advantages and improvement in compactness, efficiency, economy of manufacture and ease of operation and repair.

It is a special aim of the invention to provide for a liberal clearance of opposed clutch faces at the same time that a high pressure spring action is provided for, enabling operation of the device by a foot pedal with moderate effort, yet using a small and compact readily assembled spring device.

A specific end in view is to present a novel assembly of clutch operating connection of high leverage value so constructed and arranged as to be affected in a minimum degree by centrifugal force.

Another important attainment is the presentation of a construction having the foregoing advantages, yet which is adapted to be produced with a minimum of difficulty in manufacture, and assembled manually with few fastening devices, and a minimum requirement for the use of tools.

It is a further object to afford a novel toggle construction and operating means therefor enabling the application of the high pressures to the clutch which may be expected from the use of such a device in a simple and rugged construction yet one light in weight compared to the proportions of conventional clutch construction and the high degree of force transmitted.

A further important attainment in view is to enable ready access to all parts of the clutch operating connections for replacement or repair with a good working space therearound for manipulation of convenient tools.

It is also sought to offer a construction which will have great value for production in smaller sizes, for incorporation in small passenger cars and trucks.

Additional objects, advantages and features of invention reside in the construction, arrangement and combination of parts involved in the embodiment of the invention, as will appear or be understood from the following description and accompanying drawings, wherein:

Fig. 2 is a vertical section on the line 2—2 of Fig. 1;

Fig. 3 is a fragmentary section on the line 3—3 of Fig. 1;

Fig. 4 is a fragmentary section on the line 4—4 of Fig. 1;

Figure 1:
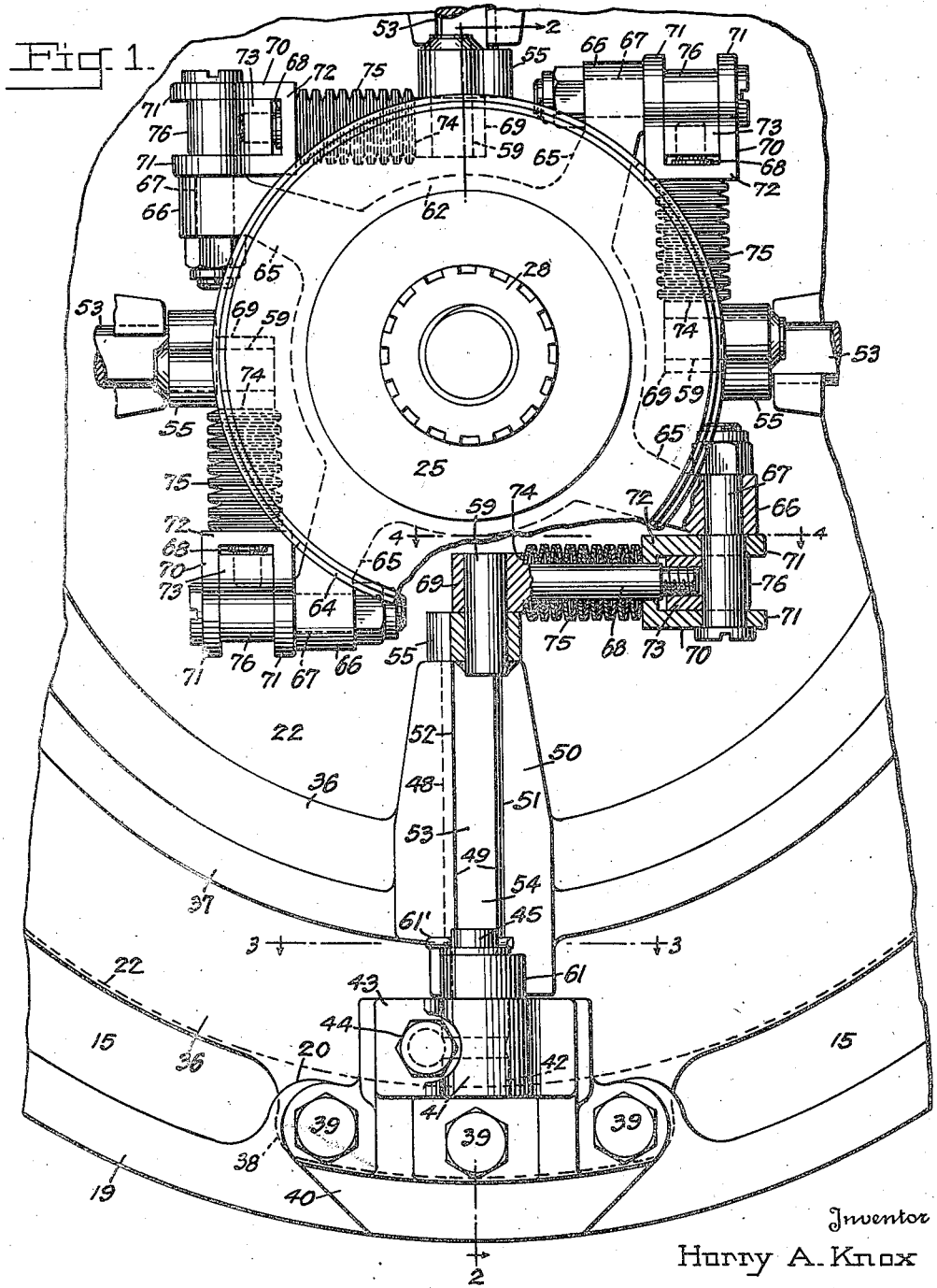
Fig. 1 is a section elevation of the rear side of a clutch constructed in accordance with my invention.

The Figures 1 and 2 are drawn approximately one-half of the full size of apparatus heretofore constructed, for tank use.

Referring to the drawings, there is shown the rear extremity of a motor shaft 10, or prime mover, having a tapered conical portion 11 a distance forwardly, ending rearwardly at a cylindrical part 12 which extends over a substantial distance rearwardly from the part 11, a splined part 13, and a relieved tenon 14 is formed on the extremity of the shaft, the outer or rear part which is externally threaded to receive a forcing nut 18 to be referred to.

A planiform circular clutch base plate 15 is provided, constituting the driving member of the clutch and having a hub 16 bored and splined to fit the splined cylindrical part 13, of the shaft, with a forward flare 16' fitting the tapered part 11 of the shaft. The hub stops short of the threaded part of the tenon and is conically relieved interiorly to receive a wedge collar 17 slidable on the forward smooth part of the tenon and fitted to the conical end of the bore in the hub. It is pressed forward by a forcing nut 18 screwed on the extremity of the tenon, whereby the hub is likewise forced on to the conical part 11 of the shaft 10, with a greater extent of support longitudinally than afforded by the ring.

The nut 18 is formed with an external hard cylindrical face to serve as a rear bearing for the driven member as will be described. The nut has a swivel connection with the collar so that unscrewing of the nut will draw out the collar.

The base plate is of substantial mass so that it may serve as a flywheel, and includes a peripheral cylindrical rearward extension or flange 19 concentric with the shaft. It has at its rear edge a series of four equally spaced lugs 20 projected inwardly toward the shaft parallel to the plate 15.

A driven member 21 is revoluble on the hub and nut, consisting of a circular disc 22 of a radius less than that of the inner edges of the lugs 20 so that it may be moved axially into and out of operative position. The disc has opposite facings 23 of suitable friction material.

The disc body is planiform over an outer annular zone 24 and throughout on its forward surface, but is progressively thickened from the zone 24 inwardly in a rearward direction.

The disc has an integral rearwardly extended hub 25, its interior bore being relieved at the forward end to accommodate roller bearings 26 working upon the hub 16 closely adjacent the base of the base plate 15. The bore of the driven hub is reduced rearwardly of the hub 16 in alinement with the nut 18, a roller bearing assembly 27 being fitted between the nut and driven hub at this part. The motor shaft terminates at the nut in this instance permitting a further substantial reduction in diameter of the hub 25 as at 28 where it is extended as a hollow splined coupling hub, a grease injection hole 29 being provided therethrough for conventional grease or oil supply fittings. Immediately adjacent the end of the hub 16 a radial port 30 is formed through the hub 25 for passage of lubricant from within the hub to a throwout sleeve felt to be described.

A concentric annular recess 31 is formed in the forward face of the disc near its axial bore, the inner side thereof having an overhang 32 to throw off lubricant escaping from the bearing 26 and the base plate 15 has an inwardly inclined annular rib 33 extended rearwardly into the recess 31, forming a gutter 34 to receive lubricant thrown off by the overhang 32, drain holes 35 leading from the bottom of the gutter forward through the plate 15 and inclined away from the shaft, so as to discharge oil forwardly from the gutter.

A presser plate 36 is mounted rearwardly of the disc for translative axial movement toward and away from the disc and base plate. This presser plate consists of a thick planiform annular body coextensive with the zone 24 of the disc and having a medial concentric stiffening rib 37, and four radial support lugs 38 spaced to aline with the lugs 20 respectively. The lugs 20 and 38 each includes an angle of about 30 degrees, so as to each receive therethrough three heavy assembly and presser plate centering bolts 39 securing brackets 40 to the rear faces of the lugs 20. The brackets project inwardly behind the presser plate and are also inclined longitudinally rearward. At their inner and rearward parts they are formed with integral radially bored and split pin holding clamp collars 41, in which are inserted enlarged cylindrical pin bodies 42 exposed at the outer sides of the collars and slotted for rotation by a screw driver or other tool at times, as will be explained the collars are split at their outer sides in a plane parallel to that of the plate 15, and the outer rearward spring arm 43 thus formed is extended and apertured as usual in such clamps, to receive therethrough a clamp bolt 44, screwed into a corresponding threaded hole in the body of the bracket under the arm. The pin body 42 has an eccentric pivot stud 45 extended longitudinally thereof and inward on a radial axis, to receive one member of a toggle to be described.

Each of the bolts 39 is in threaded engagement with the lug 20 thereat, but freely revoluble in the base of the bracket 40, and at its forward extremity is formed with a slightly reduced smooth cylindrical guide pin portion 46 extended forwardly beyond the lug 20 and engaged snugly and slidably through holes in the lugs 38 of the presser plate so as to support the latter slidably.

On the rear side of the presser plate there are quadriradiate raised bearings 50, extending partly across the rear face of the presser plate and inwardly thereof a distance, the plate having corresponding inward strengthening extensions 47 thereunder, these stop outwardly of the hub 25 a substantial distance. The bearings consist substantially of rib portions radially bored to form a semicylindrical bearing surface 48, a slot 49 being formed through one side throughout the length of the bore. One side 51 of the slot 49 in a clockwise direction is tangent to the bearing face 48 and in a plane parallel to the axis of the hub while the opposite side 52 of the slot is parallel to the side 51 and located approximately 215 degrees from the radius of the tangent mentioned, so that the clearance in the mouth of the slot is correspondingly and substantially less than the diametrical measurement of the bore.

A crank shaft 53 is provided fitted revolubly in the bearing and extending beyond each end thereof. This shaft is formed with a flat 54 throughout its length parallel to the axis of the shaft and subtending an angle of approximately 90 degrees more or less on the cylindrical surface of the shaft. As a result the measurement on a line normal to the face 54 through the axis of the shaft to its periphery is less than the width of the slot and when the shaft is presented at the slot parallel to the bearing and with the flat adjacent the side 52 the shaft may be moved laterally through the slot to a bearing in the bore. When then rotated to its approximate operative position as in Fig. 3, with the flat 54 extended across the slot, the shaft is retained firmly in place. The principal loads communicated to the shaft are sustained by the inner part of the bearing and near the side 52 of the slot. The shaft is formed with two integral upper and lower arms or levers 55—56 of short radius, each on the same radial plane of the shaft, extending obliquely across the plane of the flat 54. The upper arm 55 is formed with an enlarged base 57, providing a shoulder 58 resting against the inner end of the bearing 50.

The upper crank arm is provided with a wrist pin 59 fixed thereon and extended upwardly on an axis parallel to the projected axis of the shaft 53, while the lower arm 56 is provided with a similar pin 60, also extended upward, that is, toward the clutch axis.

A compression toggle lever link 61 is fitted on the stud 45 (retained by washer and cotter 61') and wrist pin 60, and the aggregate of the radii of the arm 56 and link 61 is greater than the distance between the axes of the shaft 53 and stud 45. This last named distance is variable by rotating the pin body 42, when the clamp 41 is released, throwing the stud 45 toward or from the presser plate. It is apparent that the arm 56 and link 61 are capable of functioning as toggle levers by movement toward their dead center relation.

On the hub 25 there is slidable a throwout sleeve 62 at the rear end of which a channel 63 is formed exteriorly, in which a throwout ring 64 is revoluble, operated conventionally by a usual yoke not shown to reciprocate the sleeve as desired. At its forward end four thrust arms 65 are formed or mounted on the sleeve extending nearly tangent to the sleeve in a counterclockwise direction and formed with respective knuckles 66 in which there are fixed respective pivot bolt studs 67 on axes parallel to the respective shafts 53 next to the bases of the arms 65. A thrust link connection is formed between the studs 67 and respective adjacent wrist pins 59, so proportioned that at the forward position of the sleeve 62, the wrist pin and stud may lie in the same plane normal to the axis of the sleeve—in other words, in dead center relation. The linkage in the present instance consists of a rod 68 having a transversely bored head 69 receiving the wrist pin 59 slidably and revolubly therethrough and removable inwardly freely when the shaft is away from its bearing. A U-shaped yoke 70 has its arms 71 apertured and engaged revolubly on the stud 67. The head 72 of this yoke is apertured to fit slidably around the rod, and the latter has a threaded tenon at its extremity between the arms of the yoke, on which a square nut 73 is screwed, fitted snugly between the arms 71 by which it is held against rotation on the rod after assembly. The nut constitutes a limiting means to the rearward movement of the yoke head 71 on the rod, and may be adjusted if desired by unscrewing and removing the stud 67 then rotating the yoke and nut together in the proper direction.

The head 69 affords a shoulder 74 around the rod next the wrist 59, and between this shoulder and the head of the yoke 70 a multiplicity of Belleville spring washers 75 are confined, slidably engaged on the rod and arranged in pairs with their concave faces opposed. These washers are in such number that when the throwout sleeve is at its rear limit the washers are moderately confined, and when the sleeve is forward to dead center relation as in Fig. 1 the washers are compressed to a desired maximum. The full extent of this movement need not be more than one-eighth inch in a heavy duty clutch, although this may be increased by decreasing the number of washers and properly proportioning the latter to give the desired maximum pressure force under the extent of compression involved when the linkage is in dead center position.

With the linkage between the throwout sleeve and crank shaft in dead center position and the presser plate 36 fully engaged against the disc and facing, the member 42 is preferably so adjusted initially that the link lever 61 and crank lever 56 are short of dead center position to the extent of between five and ten degrees of angular movement on their axes. This allows for a considerable further operation of the toggle linkage when the facings become somewhat worn, by expansion or extension of the linkage through action of the Belleville washers, which, while the parts remain in dead center relation will nevertheless effect a further thrust upon the inner crank arm 55, so as to operate the toggle through a further movement than initially set for. Also, at dead center position of the linkage to the sleeve, and initial adjustment of the toggle device, the crank arm 55 is somewhat inclined at its outer part toward the axis of the sleeve.

In order to support the sliding junction of the yoke 70 and rod 68, the nuts 73 are each provided with longitudinally extended rest arms 76 at opposite sides, adjacent and against respective arms 71 of the yoke. These arms are as wide as the arms of the yoke and have longitudinal guide slots 77 open through their outer ends and receiving the body portion of the stud 67 therein for rotation when the stud is screwed or unscrewed, but, more important for sliding movement of the stud in the slots as the yoke 70 compresses the washers 75 or withdraws oppositely on the rod 68. When the washers expand the outer end of the rod is thus supported slidingly on the stud independently of the yoke 70, preventing binding or excessive wear of the latter against the rod.

In the use of this construction, the toggle device will be considered broadly as including connecting portions 45—56—60—61, the linkage 67 to 75, the shaft 53, and the crank 55. The mechanism being assembled as described, the released position of the parts will be substantially as indicated in dotted lines in Fig. 4. The Belleville washer unit or linkage will be fully extended so that the head 72 of the yoke 70 wil be pressed against the nut 73, and the stud 67 will be at the rear limit of its movement, in full size about one and three quarter inches from dead center position. The inner crank arm 55 will be inclined inwardly toward the axis of the sleeve to a maximum and the toggle device portion 45—56—60—61 will be broken from dead center position further than shown in Fig. 3 to the extent involved by the dotted position of the inner crank arm 55 in relation to its full line position in Fig. 4. This position of the toggle will have resulted in drawing the shaft 53 rearwardly and with it the presser plate 36, slidingly on the stud ends 46 of the bolts 39, and freeing the disc 22.

On operation of the pedal or other levers customarily employed to operate the sleeve, the latter is moved slidingly forward, applying pressure throughout the linkage 67 to 75 to the crank arms 55 so as to move these outward and swinging the toggle device portion 56—60—61 toward dead center position. In the early part of this operation, relatively small opposition to compression will be manifest and the movement will require only moderate force despite the low advantage in the leverage involved. As the resistance of the washers increases so does the advantage in leverage, so that moderate effort will still effect the movement required under increasing pressure applied at the clutch faces. The operation of the clutch pedal as last described may be by spring action or manual, and may include means to limit forward movement of the throwout sleeve, as in my Patent Number 2,380,971, issued August 7, 1945.

Among the advantages of my invention in addition to those first mentioned, are the small number of fastenings such as pins and nuts or screw threaded or other fastenings of or between operative parts requiring tools or tooling in assembly, or disassembly of the mechanism. Thus, centrifugal force will hold the link lever 61 in operative position so that only a small cotter pin 61' is sufficient, required only during assembly and when the parts are at rest. Likewise the connection of the linkage with the wrist 59 requires no fastening at all, the clearance between the wrist and sleeve being insufficient for detachment of the head 69, and the latter being thrust home on the wrist by centrifugal force during operation. The assembly and disassembly of the extensible linkage also may be effected manually without a fixed fastening, the nut 73 being unscrewable by rotating the yoke 70 after dismounting. The shaft 53 is removable without tools after dismounting the linkage from the stud 67, by extracting the cotter pin 61', litfing off the link 61, and after rotating the shaft clockwise as viewed in Fig. 3 to bring the flat 54 parallel to the tangent side 51 of the bearing slot beside the shaft. At this last named position of the shaft the linkage may be lifted from the inner wrist 59, manually. The linkage may be disassembled and assembled manually, since the range of movement of the nut 73 on the threaded tenoned end of the rod is sufficient to relieve the discs of compression in outward direction and to effect full compression of the discs when screwed inward to the operative position of the nut previously described. The wall of the bearing 50 is exteriorly relieved (as shown in Figure 3) at one side at its outer end, adjacent the side 52 of the bearing slot, in line with the path of the outer wrist 60, so as to permit the latter to be swung to position for clearing the shaft from the bearing.

While I have disclosed this invention with particularity in its best construction known to me, it will nevertheless be understood that this is purely exemplary, and that changes in construction, arrangement and combination of parts, substitution of materials, and equivalents mechanical and otherwise, may be made therein without departing from the spirit of the invention as set forth in the appended claims, wherein I claim:

1. In a clutch of the character described, a rotary driving member and a coaxial rotary driven member on a main axis axially movable toward and away from the driving member, an axially movable presser plate fixed angularly with the driving member, a toggle device having one member element based on the presser plate and the other on the driving member on toggle axes substantially radial to the main axis, one member element thereof having an operating rocker shaft extended inwardly to an arc of rotation on said main axis of less radius than that of the toggle and having a crank at its inner part, a slide axially movable on and angularly fixed with the driving member, and a linkage connected between the slide and crank at an angle to the latter and at an angle to the path of relative axial movement of its connection with the slide, and means to operate the slide.

2. The structure of claim 1 in which said linkage is constructed and mounted on said slide for movement relatively thereto in a plane parallel to the said main axis.

3. The structure of claim 1 in which said linkage is constructed and connected to said slide at a distance radially outward from said main axis adjacent the radius of the arc of rotation of the crank around the main axis and spaced angularly from the crank in relation to said main axis a distance equal to the length of the linkage, whereby a dead center leverage may be applied with a minimum of elements of centrifugal force included.

4. The structure of claim 1 in which said shaft is radial, and the plane of operation of the toggle is tangent to the path of translative motion of the toggle around the said main axis.

5. The structure of claim 1 in which said shaft is radial, said toggle having its outer pivots on axes radial to said main axis, means to adjust the spacing of said pivots, said crank being movable with said shaft over a path having its mean adjacent a radial plane of said main axis and said linkage is of a length to lie on dead center between its connection with the sleeve and the crank.

6. The structure of claim 1 in which a bearing for said shaft is formed on said presser member at its rear side, the said bearing having a longitudinal slot whose diameter is of a width less than the diameter of said bearing opening therefrom toward the rear, one side of said slot being tangent to the said bearing, the said shaft having a flat disposed normally across the said slot, the transverse dimension of the shaft on a line through its axis normal to the said flat being less that the width of the slot.

7. The structure of claim 1 in which the presser plate has a bearing for said shaft extending generally radially, said shaft being revoluble therein and having a shoulder at its inner part against the bearing to transmit thereto centrifugal force evolved on rotation of the shaft translatively around said main axis, a wrist pin mounted in said crank and extending toward said main axis, said linkage including a terminal member set slidably and revolubly on the wrist pin and having an applied position extending at a tangent to the path of said wrist around said main axis, said slide having an offset bearing for the outer end of the linkage.

8. A linkage for the uses described consisting of a pressure transmitting member, a pressure applying member having angular limited convergent movement in relation thereto a link rod pivoted on the transmitting member, a pivot yoke on the pressure applying member and slidable on the rod, a nut having threaded engagement with the extremity of the rod outwardly of the yoke to limit outward movement of the yoke on the rod, and a multiplicity of Belleville washers carried by said rod between said yoke and said transmitting member and adapted to transmit the pressure applied by said pressure applying member from said yoke to said transmitting member.

9. The structure of claim 8 in which said yoke has parts extending in close fitting engagement with said nut and beyond, and the whole being proportioned so that at the pressure applying limit of movement of the pressure applying member said yoke will be clear of the nut.

10. In a clutch a rotating driving plate, a concentric rotatable driven member of less diameter, an axially movable presser plate rearwardly of the driven member, the driving plate having outer rearwardly extended parts and inwardly extended ears thereon, said presser plate having corresponding ears adapted to pass inwardly between the first named ears under relative axial translative movement of the presser plate and to lie in registry with the first named ears within said rearwardly extended parts, brackets mounted adjacent the first named ears, pressure transmitting means mounted upon said brackets and engageable with the presser plate, and headed bolt members having threaded engagement in the first named ears and slidable in the brackets and through the second named ears in supporting engagement therewith and having their heads in clamping engagement against said brackets.

11. In a clutch, a rotating driving plate, a concentric rotatable driven member of less diameter, an axially movable concentric presser plate fixed angularly with the driving plate rearwardly of the driven member constructed to clamp the driven member against the driving plate, said driving plate having rearwardly extended parts, inwardly extended brackets thereon spaced rearwardly of the presser plate, radial bearings adjacent said brackets, a shaft revoluble in each said bearing having a rearwardly extended toggle arm, a toggle link pivoted on the adjacent bracket and pivoted to the toggle arm, a crank on the shaft inwardly of the toggle extended in the same general direction as said toggle arm, a link extended therefrom having an operated position transverse to a radial plane of said driving plate, a coaxial slide axially movable on the axis of the driving plate and a thrust arm for each last named link on the slide pivotally connected to the link and movable rearwardly with the connected end of the link from said operated position, and means to operate the slide.

12. The structure of claim 11 in which means is included to adjust the pivot of said toggle link on the bracket toward and away from the driving plate, and in which said last named link is extensible, and elastic expansive means coacting between the end portion of the link to maintain a predetermined transmission of pressure between the slide and said crank.

13. The construction in claim 12 wherein the last named link includes a rod having a head revolubly mounted on the crank, a U-shaped yoke having an apertured head slidable on the rod, a stud on the respective thrust arm engaged through the arms of the yoke the rod having a threaded extremity extended between said arms of the yoke a nut screwed on the rod and held between the arms, and a protractile spring device engaged loosely around the rod and confined between the heads of the rod and yoke.

14. A clutch comprising clutch members relatively revoluble on a main axis, a toggle device, an element of which is mounted on one clutch member, and having pushing connection with the other and having its members pivoted on axes approximately radial with respect to said main axis, an eccentric linked to the toggle for adjustment of the same, a throwout member slidable relative to and fixed angularly relative to the toggle on said main axis, a pivot member on and fixed axially with the throwout member closely adjacent a tangent of the arc of movement of the toggle device around said main axis and an elastic extensible shaft connected between the said eccentric and said pivot member on the throwout and having a minimum length equal to the distance between the eccentric and pivot member when the throwout member is in position with the eccentric and pivot member in a plane normal to said main axis, constituting a dead center relation.

15. The structure of claim 8 in which said yoke has parts extended beside said nut and beyond, the whole being proportioned so that at the pressure applying limit of movement of the pressure applying member said yoke will be off bearing at the nut, said nut having a longitudinal extension slidingly engaged with the pressure applying member for support of the rod end.

16. The structure of claim 1 in which an operating crank is formed on said rocker shaft, said linkage being pivoted on said slide and the end of said crank, said pivot on the slide being angularly spaced from the axis of the rocker shaft around the axis of the clutch and said linkage being of a length to permit movement of the slide to position both pivots of said linkage in a common plane normal to the main axis.

17. The structure of claim 1 in which an operating crank is formed on said rocker shaft, said linkage being pivoted on said slide and the end of said crank, said pivot on the slide being angularly spaced from the axis of the rocker shaft around the axis of the clutch and said linkage being of a length to permit movement of the slide to position both pivots of said linkage in a common plane normal to the main axis, said linkage being movable to and beyond a dead center relation to its connections with the slide and crank whereby radial components of force in the action of the clutch are minimized.

HARRY A. KNOX.